(12) United States Patent
Nonaka (10) Patent No.: US 7,639,857 B2
(45) Date of Patent: Dec. 29, 2009

(54) IMAGING APPARATUS, CONTROL METHOD THEREOF, AND PROGRAM

(75) Inventor: Hideki Nonaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 11/176,322

(22) Filed: Jul. 8, 2005

(65) Prior Publication Data

US 2006/0013465 A1    Jan. 19, 2006

(30) Foreign Application Priority Data

Jul. 15, 2004    (JP)    ............................ 2004-208881

(51) Int. Cl.
*G06K 9/00*    (2006.01)
(52) U.S. Cl. .................................. 382/134
(58) Field of Classification Search ............... None
See application file for complete search history.

(56) References Cited

U.S. PATENT DOCUMENTS

| 4,829,587 | A | * | 5/1989 | Glazer et al. | ................ | 382/299 |
| 4,831,659 | A | * | 5/1989 | Miyaoka et al. | ............. | 382/240 |
| 4,837,844 | A | * | 6/1989 | Urushibata | .................. | 382/293 |
| 5,579,405 | A | * | 11/1996 | Ishida et al. | ................ | 382/197 |
| 7,486,983 | B2 | * | 2/2009 | Ghelmansarai et al. | ..... | 600/427 |
| 2002/0079458 | A1 | * | 6/2002 | Zur | ....................... | 250/370.11 |
| 2003/0016855 | A1 | | 1/2003 | Shinbata | ..................... | 382/132 |
| 2005/0117037 | A1 | * | 6/2005 | Nakai et al. | ................. | 348/246 |

FOREIGN PATENT DOCUMENTS

| EP | 0 823 691 A | 2/1998 |
| JP | 2002-186606 A | 7/2002 |
| WO | WO 03/049029 | * 12/2003 |

OTHER PUBLICATIONS

Ranganath, S., "*Image Filtering Using Mutliresolution Representations*," IEEE Transactions on Pattern Analysis and Machine Intelligence, IEEE Service Center, Los Alamitos, CA, USA (May 1991), vol. 13, No. 5, pp. 426-440, XP000228854, ISSN: 0162-8828.

* cited by examiner

*Primary Examiner*—Bhavesh M Mehta
*Assistant Examiner*—Alex Liew
(74) *Attorney, Agent, or Firm*—Fitzpatrick, Cella, Harper & Scinto (57) ABSTRACT

Radiation image data obtained by an imaging unit in a radiation irradiation state is stored. Reference image data obtained by the imaging unit in a radiation non-irradiation state is stored. Reduced radiation image data and reduced reference image data as reduced image data of the radiation image data and the reference image data are generated. Offset correction processing is executed between the radiation image data and the reference image data. After output of the reduced radiation image data and the reduced reference image data to the external device is ended, offset-corrected radiation image data is output to an external device.

12 Claims, 9 Drawing Sheets

EXTRACTED PIXEL IN 4-POINT MEAN        EXTRACTED PIXEL IN 8-POINT MEAN

IMAGING APPARATUS, CONTROL METHOD THEREOF, AND PROGRAM

FIELD OF THE INVENTION

The present invention relates to an imaging apparatus which outputs, to an external device, image data obtained by an imaging unit to radiograph a subject by using radiation, a control method thereof, and a program.

BACKGROUND OF THE INVENTION

In normal X-ray imaging, radiography is executed by a film screen system or an IP (Imaging Plate) system using photostimulable phosphor. It takes several minutes to see a sensed image. This is because a time is necessary for a film process in the former system and for reading by a reading apparatus in the latter system.

The radiographed state, i.e., whether exposure in radiography was appropriate or whether the target was radiographed at an accurate angle is confirmed after such a wait time. For this reason, if radiography fails, the workflow of X-ray inspection may be disturbed.

When the radiography result can be confirmed at an earlier timing, it can early be determined whether re-imaging is necessary, and a satisfactory workflow of X-ray inspection can be maintained.

From this viewpoint, for example, Japanese Patent Laid-Open No. 2002-186606 discloses an X-ray diagnosis apparatus operation method which executes various kinds of correction for data obtained by undersampling a whole image and then displays the data by using a solid-state detector for X-ray image display.

In this X-ray diagnosis apparatus operation method, whole image data is acquired from the detector. Then, a low-resolution image (reduced image) is generated by undersampling the data and previewed on the basis of this data. To do this, data transfer from the detector to the operation unit must be done for all image data.

The pixel matrix of a general digital X-ray imaging apparatus includes several thousand x several thousand pixels (e.g., 2,000×2,000 pixels or more). Since data per pixel is 8 to 16 bits, an enormous data amount must be transferred. To shorten the time until preview display under these circumstances, the data transfer rate must be increased by using a multi-bit data transfer path or increasing the data transmission rate.

However, in the former case, the cable of the data transfer path becomes thick, resulting in poor portability. In the latter case, the cost of parts of I/O units increases, and high transmission quality can hardly be ensured.

Image data cannot be used as a diagnostic image until it undergoes preprocesses such as offset correction, gain correction, and defect correction and post-processes such as dynamic range adjustment and display LUT adjustment.

In the post-processes, parameters for image adjustment change depending on the type (e.g., target part) of a sensed image. To automatically adjust the quality of the diagnostic image, the parameters for the post-processes must be determined by analyzing the sensed image. When a preview image can be used for this analysis, the processing speed of the system can be increased. For this purpose, however, a high-quality preview image is necessary. The image quality is insufficient in an uncorrected coarse image or a simple offset correction image using dummy offset data obtained by pre-calibration.

The characteristics of the parts of the imaging unit change depending on the environment such as ambient temperature. Dark noise in the X-ray detector in the imaging unit varies even depending on the radiographic operation time. Calibration data cannot contain these variation components before radiography. To minimize the variation components, offset data must be acquired by reproducing the same operation as in radiography in an X-ray non-irradiation state immediately after radiography.

However, even with this measure, when a reduced image is generated by undersampling after all pixel data are transferred, the time required for data transfer is a bottleneck, resulting in a problem in shortening the time until image display.

SUMMARY OF THE INVENTION

The present invention has been made to solve the above-described problems, and has as its object to provide an imaging apparatus capable of rapidly and efficiently outputting the preview image of a sensed image, a control method thereof, and a program.

According to the present invention, the foregoing object is attained by providing an imaging apparatus which outputs, to an external device, image data obtained by an imaging unit to radiograph a subject by using radiation, comprising:

first storage means for storing radiation image data obtained by the imaging unit in a radiation irradiation state;

second storage means for storing reference image data obtained by the imaging unit in a radiation non-irradiation state;

reduction means for generating reduced radiation image data and reduced reference image data as reduced image data of the radiation image data and the reference image data;

execution means for executing offset correction processing between the radiation image data and the reference image data; and output means for, after output of the reduced radiation image data and the reduced reference image data to the external device is ended, outputting offset-corrected radiation image data obtained by the execution means to the external device.

In a preferred embodiment, the reduction means generates the reduced image data by extracting, from all pixels obtained by the imaging unit, at least one of pixel groups located on two pairs of diagonals of an n×n pixel (n: natural number) square region of the imaging unit.

In a preferred embodiment, the value n is determined on the basis of at least one of necessary size and image quality of the reduced image data, a time allowable for output to the external device, a pixel pitch of the imaging unit, and a grid pitch of an X-ray antiscatter grid.

In a preferred embodiment, the reduction means generates one pixel of the reduced image data, which expresses an n×n pixel (n: natural number) square region on all pixels, by extracting, from all pixels obtained by the imaging unit, at least one of pixel groups located on two pairs of diagonals of the n×n pixel square region of the imaging unit and executing a filter operation for the extracted pixels.

In a preferred embodiment, in the filter operation, the value n is an even number, and a weight is an even function.

In a preferred embodiment, the output means first outputs the reduced radiation image data to the external device at once, then outputs the reduced reference image data to the external device at once, and finally outputs the offset-corrected radiation image data obtained by the execution means to the external device.

In a preferred embodiment, the output means first divides the reduced radiation image data into a predetermined division unit and sequentially outputs the data to the external device, then divides the reduced reference image data into a predetermined division unit and sequentially outputs the data to the external device, and finally outputs the offset-corrected radiation image data obtained by the execution means to the external device.

In a preferred embodiment, the second storage means stores the reference image data obtained by the imaging unit in the radiation non-irradiation state after the radiation image data obtained by the imaging unit in the radiation irradiation state is stored in the first storage means.

In a preferred embodiment, the reduction means first generates the reduced radiation image data substantially simultaneously with storage of the radiation image data in the first storage means, the output means outputs the reduced radiation image data to the external device, the reduction means then generates the reduced reference image data substantially simultaneously with storage of the reference image data in the second storage means, and the output means then outputs the reduced reference image data to the external device and finally outputs the offset-corrected radiation image data to the external device.

According to the present invention, the foregoing object is attained by providing a control method of an imaging apparatus which outputs, to an external device, image data obtained by an imaging unit to radiograph a subject by using radiation, comprising:

a first storage step of storing radiation image data obtained by the imaging unit in a radiation irradiation state in a first storage unit;

a second storage step of storing reference image data obtained by the imaging unit in a radiation non-irradiation state in a second storage unit;

a reduction step of generating reduced radiation image data and reduced reference image data as reduced image data of the radiation image data and the reference image data;

an execution step of executing offset correction processing between the radiation image data and the reference image data; and an output step of, after output of the reduced radiation image data and the reduced reference image data to the external device is ended, outputting offset-corrected radiation image data obtained in the execution step to the external device.

According to the present invention, the foregoing object is attained by providing a program which implements control of an imaging apparatus which. outputs, to an external device, image data obtained by an imaging unit to radiograph a subject by using radiation, comprising:

a program code for a first storage step of storing radiation image data obtained by the imaging unit in a radiation irradiation state in a first storage unit;

a program code for a second storage step of storing reference image data obtained by the imaging unit in a radiation non-irradiation state in a second storage unit;

a program code for a reduction step of generating reduced radiation image data and reduced reference image data as reduced image data of the radiation image data and the reference image data;

a program code for an execution step of executing offset correction processing between the radiation image data and the reference image data; and a program code for an output step of, after output of the reduced radiation image data and the reduced reference image data to the external device is ended, outputting offset-corrected radiation image data obtained in the execution step to the external device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
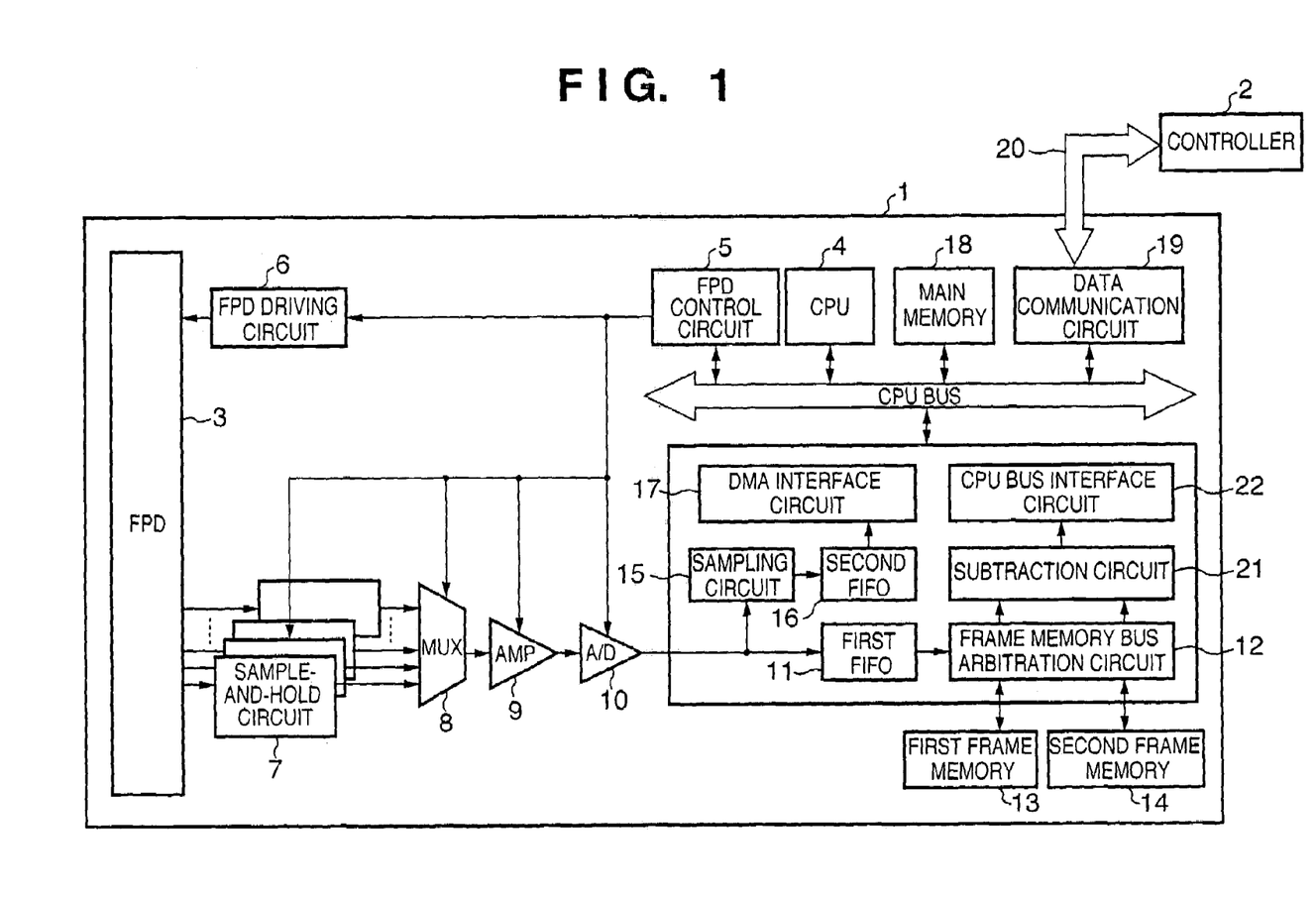
FIG. 1 is a block diagram showing the arrangement of an X-ray imaging apparatus according to the embodiment of the present invention.

FIG. 1 is a block diagram showing the arrangement of an X-ray imaging apparatus according to the embodiment of the present invention.

An imaging unit 1 is connected to a controller 2 serving as an external device through an external communication cable 20. The controller 2 provides a diagnostic image by executing preprocesses such as offset correction, gain correction, and defect correction and post-processes such as dynamic range adjustment and display LUT adjustment for image data received from the imaging unit 1 and also controls the imaging unit 1.

The controller 2 is formed from a general-purpose computer such as a personal computer. The general-purpose computer has constituent elements such as a CPU, RAM, ROM, hard disk, external storage device, network interface, display, keyboard, and mouse. In addition to the controller 2, image output devices such as a monitor and printer may be connected to the imaging unit 1 as external devices.

The imaging unit 1 includes units shown in FIG. 1. Reference numeral 3 denotes a flat panel detector (to be referred to as an FPD hereinafter). The FPD 3 is formed by combining a scintillator made of, e.g., cesium iodide (CsI) and a two-dimensional photodetector made of amorphous silicon (a-Si). When X-rays enter the scintillator, it emits visible light toward the two-dimensional photodetector. As a result, an X-ray visible light image is generated.

In this embodiment, the imaging unit 1 by X-ray imaging will be exemplified. However, the present invention can also be applied to radiation other than X-rays.

The pixels on each row of the two-dimensional photodetector are addressed simultaneously by an FPD driving circuit 6. The outputs are held by sample-and-hold circuits 7. The held pixel outputs pass through a multiplexer (MUX) 8. The charge is amplified by an amplifier (AMP) 9 and sequentially converted into a digital value by an A/D converter 10. The read operation or imaging operation is controlled by an FPD control circuit 5.

Every time the read of the pixels on each row is ended, the FPD driving circuit 6 sequentially drives the rows on the FPD 3. As a result, the values of all pixels of the FPD 3 are converted into digital values by the A/D conversion operation of the A/D converter 10.

The output from the A/D converter 10 is stored in a first frame memory 13 or second frame memory 14 through a first FIFO 11 and frame memory bus arbitration circuit 12. The frame memory bus arbitration circuit 12 is provided to write data from the FPD 3 and execute bus arbitration of the data read from a CPU 4.

The frame memory bus arbitration circuit 12 also has a function of a bus selector which selects a frame memory to write data from the FPD 3 in the X-ray irradiation state and non-irradiation state. In, e.g., recording data (X-ray image) in the X-ray irradiation state, the data is written in the first frame memory 13. In recording data (offset image) in the X-ray non-irradiation state, the data is written in the second frame memory 14.

Simultaneously as the data from the FPD 3 is written in the first frame memory 13 or second frame memory 14, the same data is sent to a sampling circuit 15. The sampling circuit 15 sends only necessary data to a second FIFO 16 of the subsequent stage such that a predetermined sampling pattern is obtained.

Dark noise in the FPD 3 in the imaging unit 1 varies even depending on the X-ray imaging operation time. Calibration data cannot contain these variation components before radiography. To minimize the variation components, an offset image as a correction image (reference image) to correct the variation components is acquired by reproducing the same operation as in radiography in the X-ray non-irradiation state immediately after radiography. When offset correction processing is executed between the offset image and the X-ray image obtained by X-ray imaging, an offset-corrected X-ray image whose variation components are corrected can be obtained.

Sampling processing by the sampling circuit 15 will be described next.

When passing through a subject, X-rays cause scattering in addition to absorption by the subject itself. An X-ray image is observed through a subject by using the X-ray source as a light source. Hence, only X-ray components which have passed through the subject in a straight line from the X-ray source are preferably detected. Scattered X-rays are scattered even to portions except lines which connect the X-ray source and the pixels on the FPD 3. Such an image is fogged and blurred as a whole.

As a member to absorb the scattered X-rays, an X-ray antiscatter grid which contains a substance with a high X-ray absorbance and a substance with a low X-ray absorbance (e.g., a combination of lead and aluminum) in a grid shape is arranged between the subject and the imaging unit 1. Only X-ray components which enter from the projection line from the X-ray source are made to pass through the pixels on the FPD 3. Other X-ray components are absorbed by the high X-ray absorption substance. With this arrangement, an image with a high contrast is obtained.

However, the substance itself, which forms the matrix of the X-ray antiscatter grid, also has a thickness. For this reason, the intensity distribution of X-rays which pass through the X-ray antiscatter grid is generated in accordance with the period of the grid array (to be referred to as a grid pitch hereinafter). Sampling is executed for the periodical signal by the pixels on the FPD 3. Hence, moiré (to be referred to as grid fringes herein) is generated on the acquired image in accordance with both the grid pitch and the pixel pitch.

Data of experiments conducted by the present applicant in relation to grid fringe reduction will be described below.

Figure 2:
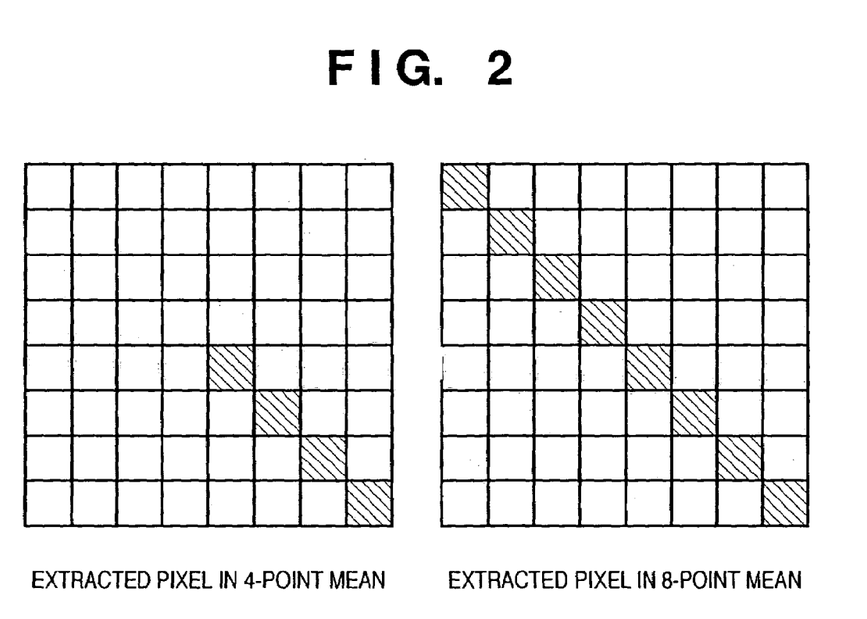
FIG. 2 is a view showing an example of pixel sampling in reduced image creation according to the embodiment of the present invention.

The pixel size in the imaging unit 1 is 160 μm×160 μm. The grid pitch of the X-ray antiscatter grid is 40 grids/cm. To check only grid fringes, no subject is placed. An X-ray image corresponding to only the X-ray antiscatter grid is acquired at a low tube voltage. As a reduced image, an image with an area ratio of ⅛ is assumed. One pixel of a reduced image is formed from an 8×8 pixel region. Pixels as shown in FIG. 2 are extracted, and the simple mean values of the pixels are used (these modes will be defined as 4-point mean and 8-point mean, respectively, hereinafter).

The size of the square region including n×n pixels is determined on the basis of at least one of the necessary size and quality of the reduced image (one pixel of a reduced image expresses a wider region as n becomes large so that the image becomes coarse), the time allowable for reduced image transfer, the pixel pitch of the imaging unit 1, the grid pitch of the X-ray antiscatter grid, and the grid fringe generation period predicted from the pixel pitch and grid pitch.

Figure 3:
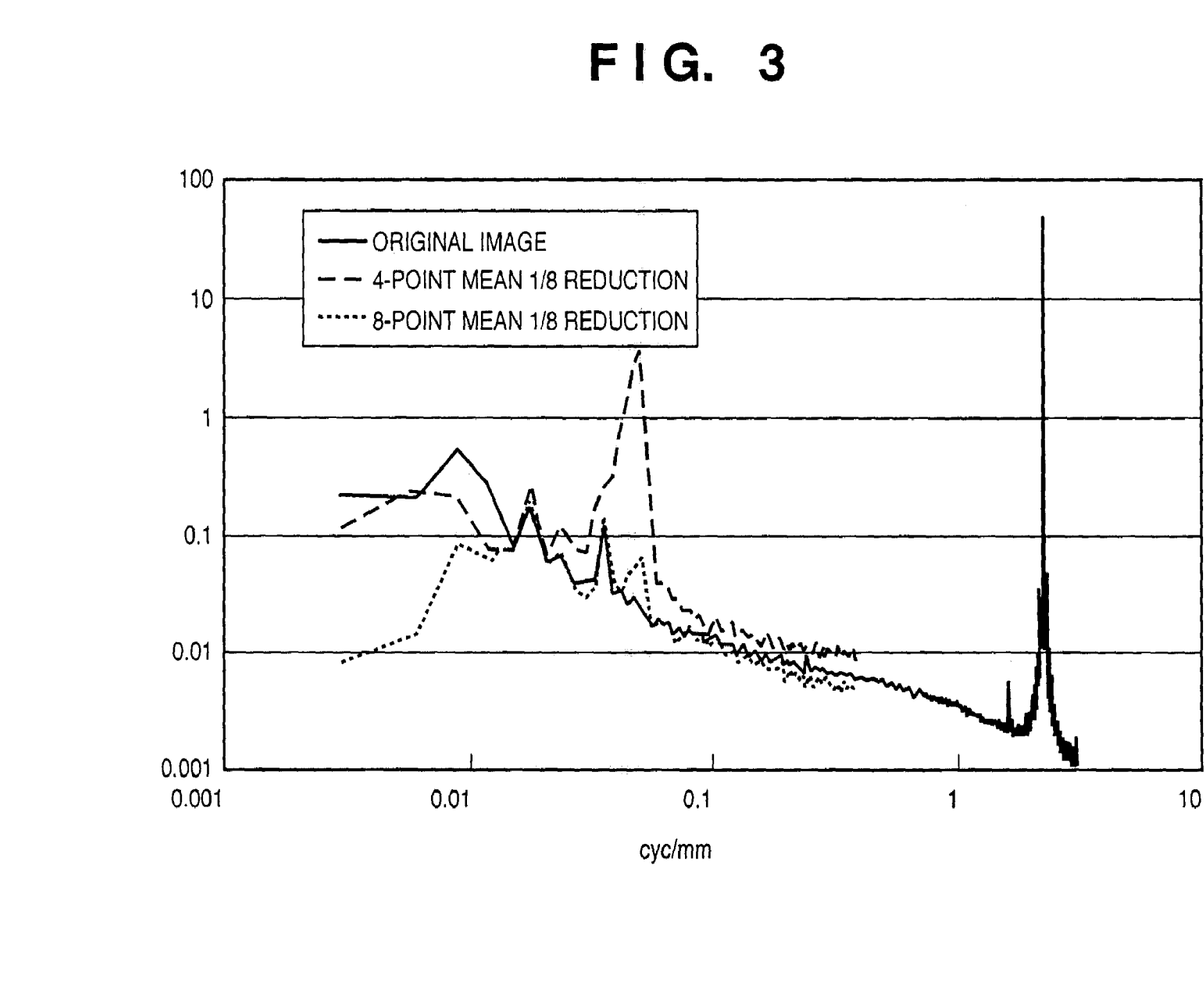
FIG. 3 is a graph showing the power spectrum of a reduced image by pixel sampling and simple mean according to the embodiment of the present invention.

FIG. 3 shows the mean power spectrum of the entire image in the horizontal direction. The spectrum of the entire image and the mean power spectra of the two types of reduced images are superimposed. As is apparent from FIG. 3, the grid fringes are not completely suppressed in the reduced image by 4-point mean. The filter characteristic of the 4-point mean reduced image is given by $$\frac{|Z^{-1}+Z^{-2}+Z^{-3}+Z^{-4}|}{4} \quad (1)$$

The filter characteristic of the 8-point mean reduced image is given by $$\frac{|Z^{-1}+Z^{-2}+Z^{-3}+Z^{-4}+Z^{-5}+Z^{-6}+Z^{-7}+Z^{-8}|}{8} \quad (2)$$

Figure 4:
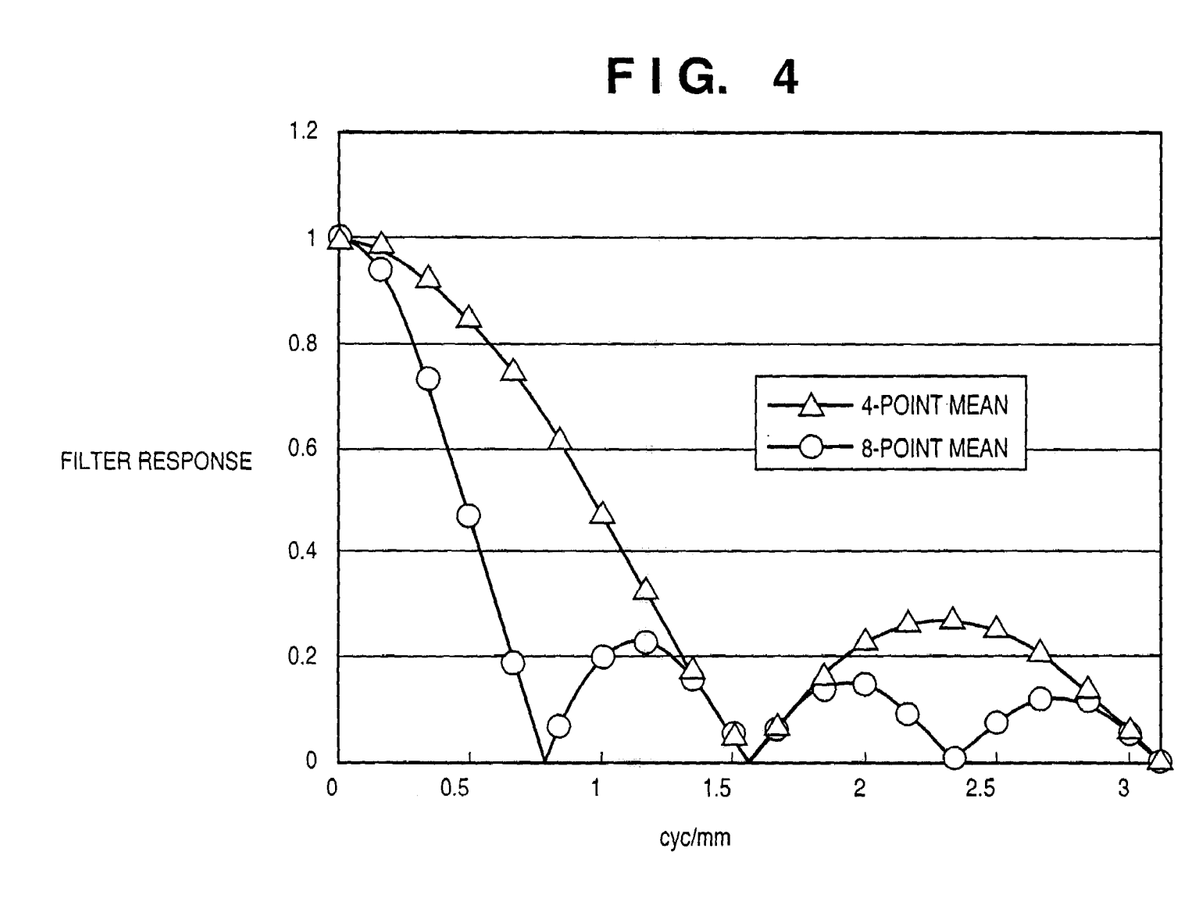
FIG. 4 is a graph showing the filter characteristic in pixel sampling and simple mean according to the embodiment of the present invention.

This is represented by the graph shown in FIG. 4 (Z is the delay operator (z transform) corresponding to one sample (160 μm); since it is the horizontal spectrum characteristic that is important, this can be considered by projection of a two-dimensional weight coefficient). In 4-point mean, an image with a lower degree of suppression in the low-frequency region, i.e., an image without blur at a higher resolution can be obtained.

From the viewpoint of suppressing the grid fringes, 8-point mean is more advantageous. However, the resolution is insufficient in the simple mean. To increase the resolution, not the simple mean but a filter coefficient must be set. With the pixel pitch and grid pitch assumed here, grid fringes are generated near 2.25 cyc/mm. For this reason, a filter whose degree of suppression is high in this region and low in the low-frequency portion is suitable. To increase the speed of filter operation, the weight of each point is an even function (pairs of four points). This can be given by $$\frac{|aZ^{-1} + bZ^{-2} + cZ^{-3} + dZ^{-4} + dZ^{-5} + cZ^{-6} + bZ^{-7} + aZ^{-8}|}{2 \times (a + b + c + d)} \quad (3)$$

by the above-described z transform, in which a, b, and c in the expression determine the filter characteristic.

Figure 5:
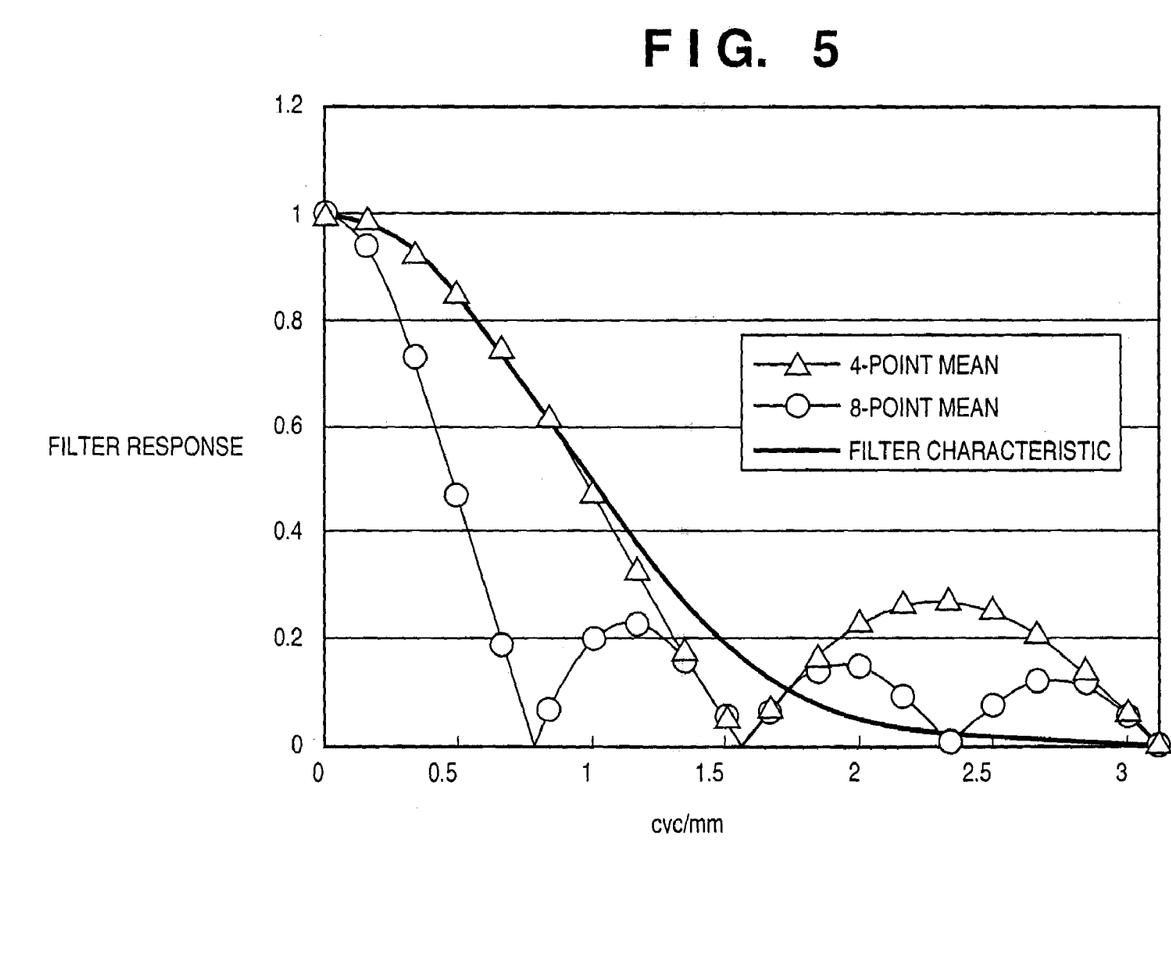
FIG. 5 is a graph showing the filter characteristic in pixel sampling and filter operation according to the embodiment of the present invention.

FIG. 5 shows the filter characteristic for a=0, b=1, c=4, and d=8 in consideration of the simplicity of operation by hardware or software (when the same coefficients are used, many shift operations can be used so that a high-speed operation can be expected).

As is apparent from the graph shown in FIG. 5, the degree of suppression is high in a high-frequency region of 1.5 cyc/mm or more. The same characteristic as in 4-point mean is ensured in a region of 1.5 cyc/mm or less where image components are mainly contained. Since a smooth characteristic is obtained, no inverted point (zero point) is present.

In this example, a filter 0-1-4-8-8-4-1-0 is applied to eight diagonal pixels in an 8×8 pixel region to form one pixel of a reduced image. In this arrangement, however, even when the relative positions of the imaging unit and X-ray antiscatter grid are rotated 90° (i.e., the grid fringes which are conventionally present in the vertical direction in the image is present in the horizontal direction), the positions of pixels to be extracted and the filter are point-symmetrical with respect to the center of the 8×8 pixel region. Hence, no problem is posed.

In the above example, at least one of pixel groups located on the diagonals of the 8×8 pixel region is extracted to form a reduced image. Even when another pixel group on the diagonals is extracted to form a reduced image, the same effect as described above can be obtained.

As described above, the reduced image creation method is determined on the basis of the reduction ratio of the reduced image with respect to the entire image, the pixel pitch of the imaging unit, and the grid pitch of the X-ray antiscatter grid. The numerical values used here are merely examples, and the present invention is not limited to this. For example, when reduced image formation from the entire image is done from an n×n (n is an even number because of an even function is used) region, the filter represented by expression (3) is given by $$\frac{\left| \begin{array}{c} k_1 Z^{-1} + k_2 Z^{-2} + \ldots + k_{n/2} Z^{-n/2} + \\ k_{n/2} Z^{-(n/2+1)} + \ldots + k_2 Z^{-(n-1)} + k_1 Z^{-n} \end{array} \right|}{2 \times (k_1 + k_2 + \ldots + k_{n/2-1} + k_{n/2})} \quad (4)$$

The sampling method and filter processing have been described above. However, the present invention is not limited to this. For example, to simplify the hardware configuration of the imaging unit 1, for a reduced image, the imaging unit 1 may execute only extraction of diagonal pixels in the 8×8 pixel region. The extracted data is transferred to the controller 2 so that the subsequent filter processing is executed by the controller 2. Even with this arrangement, the data transfer amount can be reduced to ⅛ of the entire image data. Hence, the purpose of shortening the time until preview display can be achieved.

Actually, the sampling method can easily be implemented by counting the number of pixels in the main scanning direction and the number of lines in the sub-scanning direction. For example, to extract the above-described pixels on the diagonals of the 8×8 pixel region, 3-bit cyclic counters are used. In the main scanning direction, the count value is incremented every time one pixel of the FPD 3 is read. In the sub-scanning direction, the count value is incremented every time one line of the FPD 3 is read.

In the 3-bit counter, the count range is 0 to 7. The value returns from 7 to 0. When the count values are represented by F and S, pixels read at a timing which satisfies F=S ($0 \leq F \leq 7$, $0 \leq S \leq 7$) are extracted. In this way, the sampling circuit 15 can very simply be formed.

The filter processing can also easily be implemented. The above-described filter for a=0, b=1, c=4, and d=8 is used. For filter coefficient multiplication, a coefficient to be multiplied is selected from the value of the counter F in the main scanning direction. The actual operation is implemented by a shift operation. The correspondence between the count value in the main scanning direction (binary expression is used for a description to be done later) and the filter coefficient is represented by a=0 (F=000B, 111B), b=1 (F=001B, 110B), c=4 (F=010B, 101B), and d=8 (F=011B, 100B).

As is apparent, the count value of the counter F using the same coefficient is the same when the exclusive OR of bit 0 or 1 and bit 2 is calculated. The correspondence between the filter coefficient and the value F' after exclusive OR calculation is represented by a=0 (F'=00B), b=1 (F'=01B), c=4 (F'=10B), and d=8 (F'=11B).

When a=0, data is replaced with 0. For b=1, data is output without any processing. When c=4 or d=8, data is multiplied by 4 or 8. Since $4=2^2$ and $8=2^3$, the processes are implemented by executing arithmetic shift of 2 bits and 3 bits to the left, respectively. If the filter coefficient multiplication is to be executed by hardware, the filter coefficient multiplication circuit is added between the sampling circuit 15 and the second FIFO 16.

The division in the filter operation represented by expression (3) can be implemented by hardware including a comparator, adder (subtraction processing can be executed by adding a complement of 2 of the numerical value to be subtracted), and shift operator if the simplest integral operation can be employed.

The filter operation is done for the 8×8 pixel region, as described above. The data read from the FPD 3 is executed for each line. For this reason, sampling pixel data selected in accordance with the above-described sampling method must be held until the read of eight lines is ended.

In this case, a memory which has a storage capacity equal to or more than the image data size of eight lines and holds sampling pixel data is prepared separately. When eight lines are read, the above-described filter coefficient multiplication, addition of sampling pixel data after coefficient multiplication, and division processing are executed for the sampling pixel data stored in the memory. Then, the data is output to the second FIFO 16.

Alternatively, a memory which has a capacity equal to or more than the data size of (pixels of one line/8) pixels and holds sampling pixel data is prepared separately. When the sampling pixel data is selected, filter coefficient multiplication and addition of sampling pixel data after coefficient multiplication are executed. An operation result for a sampling pixel in the same 8×8 pixel region is written back to the same memory area. When eight lines are read, the division processing is executed in addition to the above-described filter coefficient multiplication and sampling pixel data addition, and the operation result is written back to the memory.

When the read of eight lines is ended, a result obtained by executing the filter operation for sampling pixels in the 8×8 pixel region is held by the memory. The data may sequentially be transferred to the second FIFO 16. Alternatively, the memory may be formed from a dual port memory to replace the second FIFO 16.

The same effect as described can also be obtained when the above-described filter coefficient multiplication, sampling pixel data addition, and division are executed in transferring data from a data communication circuit 19 to the controller 2 by software control of the CPU 4. These operations may be executed not by the imaging unit 1 but by the controller 2.

Figure 6:
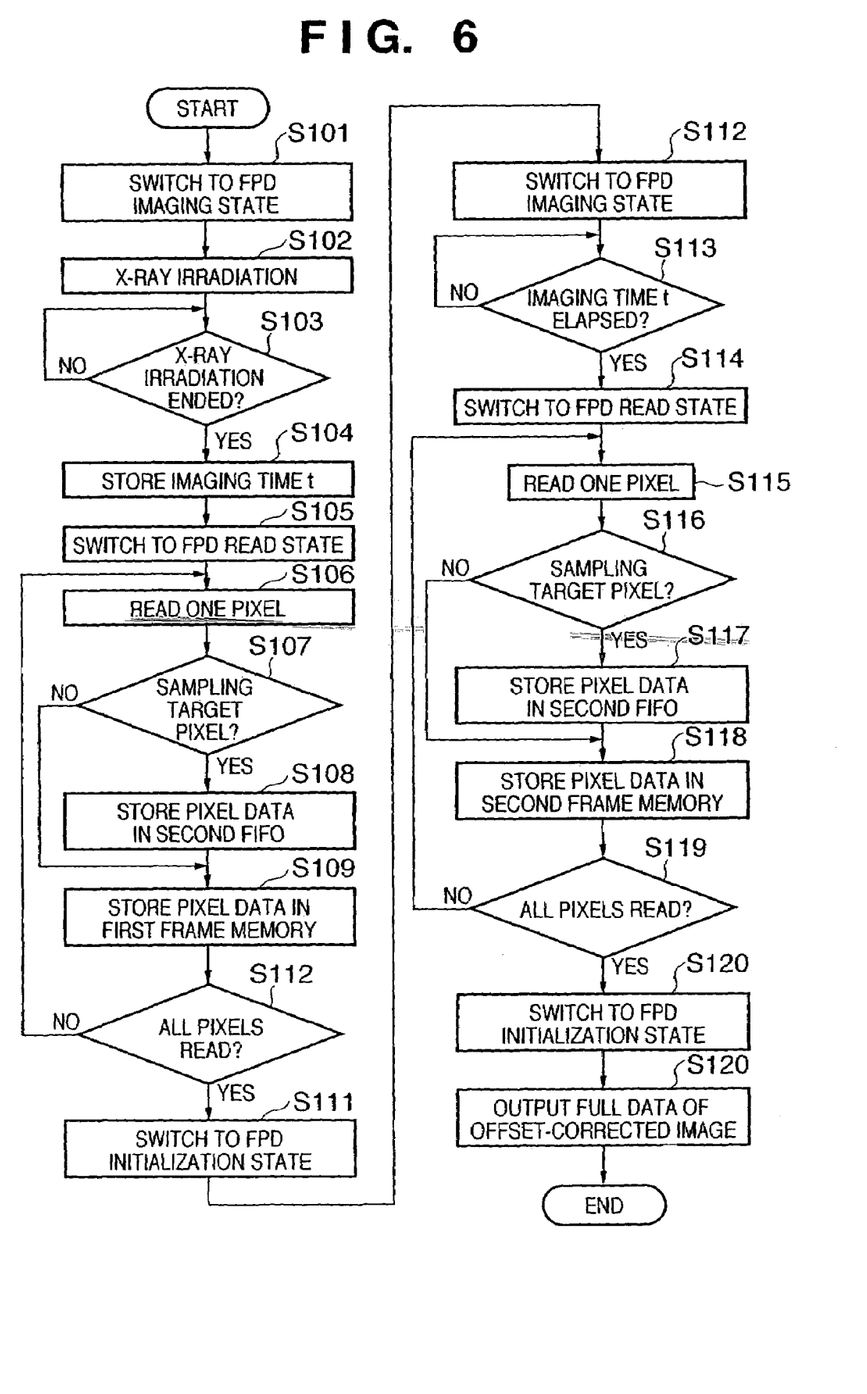
FIG. 6 is a flowchart showing the operation main flow of the X-ray imaging apparatus according to the embodiment of the present invention.
Figure 7A:
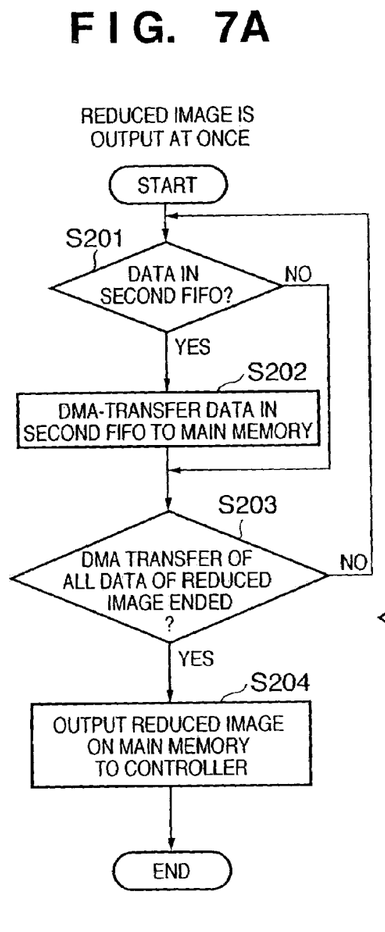
FIG. 7A is a flowchart showing the operation sub-flow of the X-ray imaging apparatus according to the embodiment of the present invention.
Figure 7B:
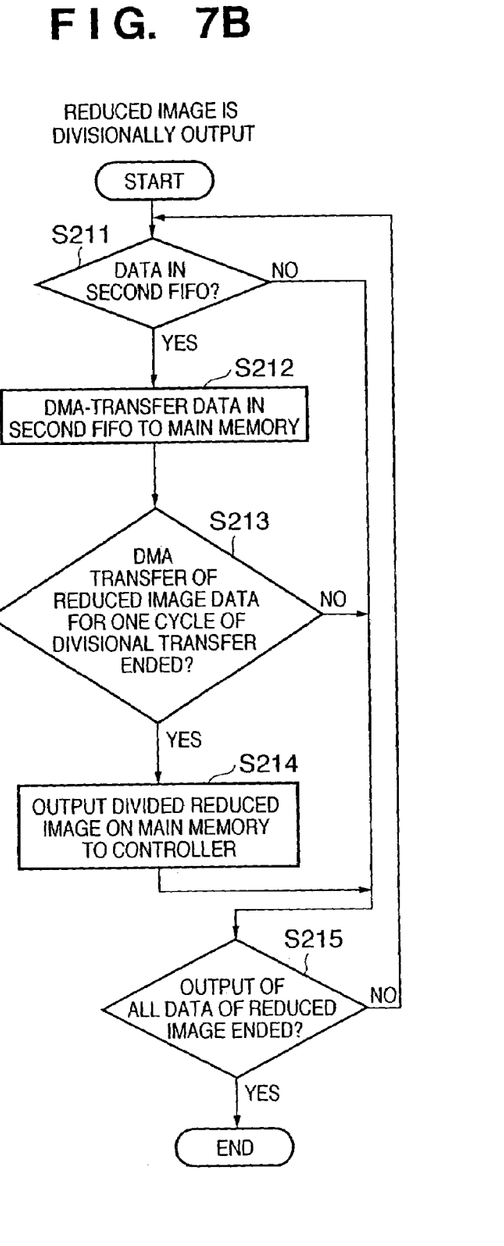
FIG. 7B is a flowchart showing the operation sub-flow of the X-ray imaging apparatus according to the embodiment of the present invention.
Figure 8:
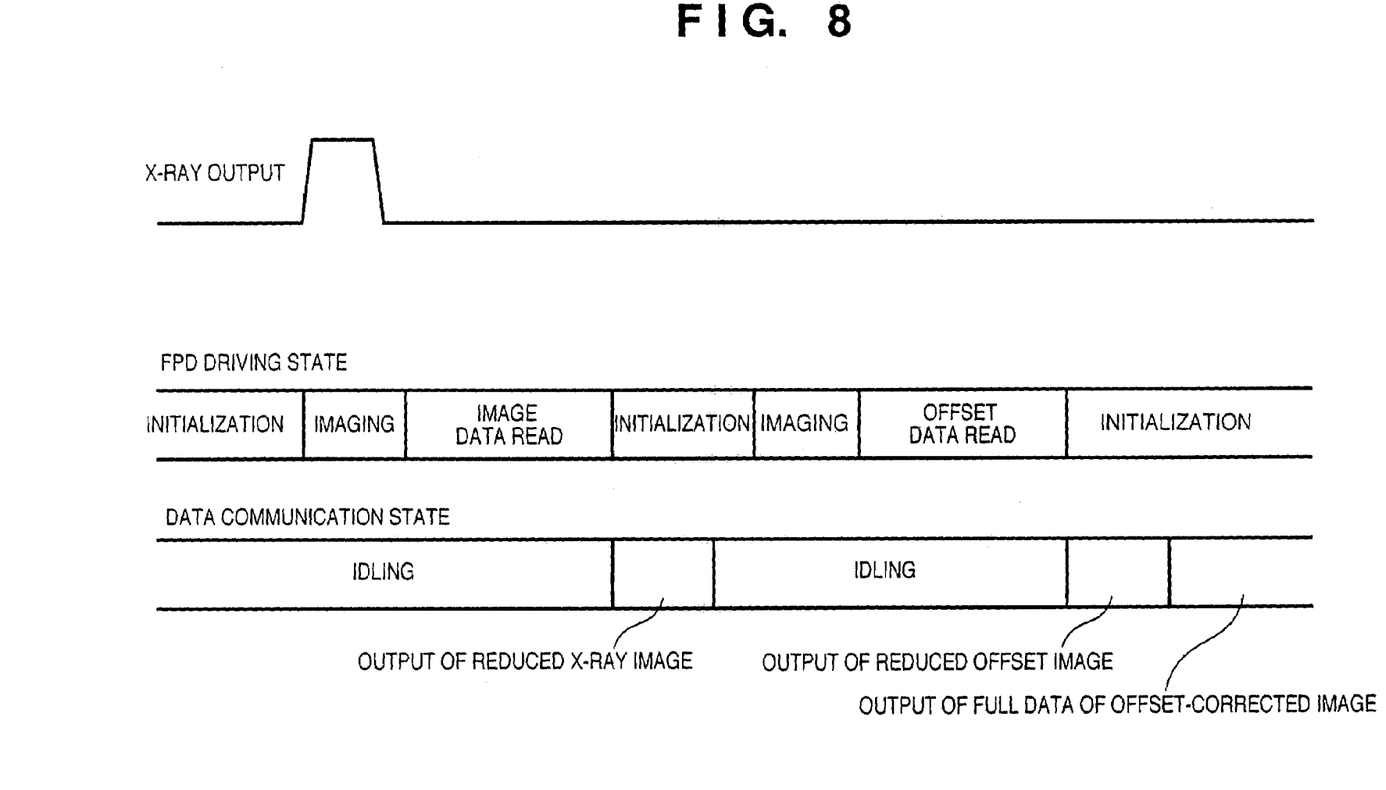
FIG. 8 is a timing chart showing the operation state of the X-ray imaging apparatus according to the embodiment of the present invention.
Figure 9:
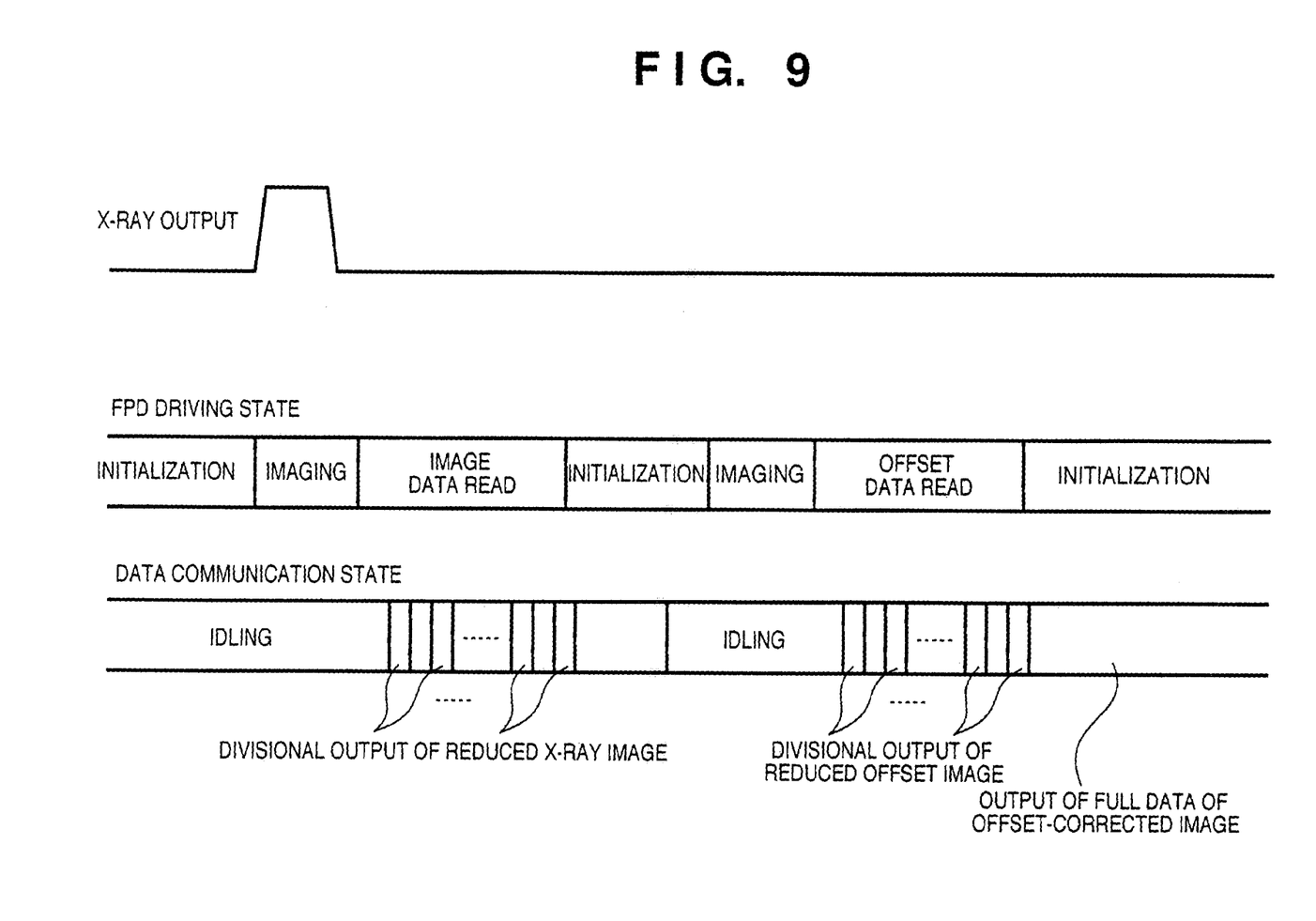
FIG. 9 is a timing chart showing the operation state of the X-ray imaging apparatus according to the embodiment of the present invention.

FIG. 6 shows the operation main flow of the X-ray imaging apparatus according to the embodiment of the present invention. FIGS. 7A and 7B show the sub-flow which is executed in parallel to the operation main flow when sampling pixel data (reduced image data) is stored in the second FIFO 16. FIGS. 8 and 9 are timing charts showing the X-ray output, FPD driving state, and data communication state along the time axis plotted along the abscissa.

Normally, the FPD 3 is in the initialization state. To execute X-ray irradiation to acquire an X-ray image of a subject, the FPD 3 switches for the initialization state to the imaging state (step S101).

As for switch of the FPD 3 to the imaging state, the X-ray irradiation state may always be monitored, and the imaging state may be set upon detecting X-ray irradiation. Alternatively, the driving state of the FPD 3 and the X-ray irradiation state may be synchronized by causing the controller 2 or imaging unit 1 to establish synchronization with respect to the X-ray control device (controller 2). In the present invention, any method can be used.

In the imaging state, X-ray irradiation is executed (step S102). The end of X-ray irradiation is determined (step S103). In the FPD 3, charges corresponding to the intensity of incident X-rays are generated and accumulated. When X-ray irradiation is ended (YES in step S103), an imaging time t is stored (step S104). Then, the FPD 3 switches to the read state (step S105). The read method has been described above. This will briefly be described below.

One pixel is read from the FPD 3 (step S106). It is determined whether the read pixel is a sampling target pixel (step S107). If the pixel is a sampling target pixel (YES in step S107), the flow advances to step S108 to store the pixel data of the read pixel in the second FIFO 16. Then, the flow advances to step S109 to store the pixel data of the read pixel in the first frame memory 13. If the pixel is no sampling target pixel (NO in step S107), the flow advances to step S109 to store the pixel data of the read pixel in the first frame memory 13.

It is determined whether all pixels on the FPD 3 are read (step S110). If the read is not ended (NO in step S110), the flow returns to step S106. If the read is ended (YES in step S110), the flow advances to step S111.

With the above processing, a full-size X-ray image of the subject is stored in the first frame memory 13, and the sampling X-ray image (reduced X-ray image) is stored in the second FIFO 16.

Immediately after X-ray imaging, a full-size offset image and a sampling offset image are acquired by reproducing the same operation as in X-ray imaging in the X-ray non-irradiation state. This will be described below.

The FPD 3 switches to the initialization state (step S111). Then, the FPD 3 switches to the imaging state (step S112). After switching to the imaging state, it is determined whether the stored imaging time t has elapsed (step S113). If the imaging time t has elapsed (YES in step S113), the FPD 3 switches to the read state (step S114).

One pixel is read from the FPD 3 (step S115). It is determined whether the read pixel is a sampling target pixel (step S116). If the pixel is a sampling target pixel (YES in step S116), the flow advances to step S117 to store the pixel data of the read pixel in the second FIFO 16. Then, the flow advances to step S118 to store the pixel data of the read pixel in the second frame memory 14. If the pixel is no sampling target pixel (NO in step S116), the flow advances to step S118 to store the pixel data of the read pixel in the second frame memory 14.

It is determined whether all pixels on the FPD 3 are read (step S119). If the read is not ended (NO in step S119), the flow returns to step S115. If the read is ended (YES in step S119), the flow advances to step S120.

With the above processing, a full-size offset image in the X-ray non-irradiation state is stored in the second frame memory 14, and the sampling offset image (reduced offset image) is stored in the second FIFO 16.

After that, the FPD 3 switches to the initialization state (step S120). A subtraction circuit 21 executes offset correction by using the X-ray image stored in the first frame memory 13 and the offset image stored in the second frame memory 14. The offset-corrected full image is output to the controller 2 through a CPU bus interface circuit 22, CPU bus, data communication circuit 19, and external communication cable 20.

In parallel to the processing shown in FIG. 6, the reduced X-ray image and reduced offset image sequentially stored in the second FIFO 16 are sequentially transferred to the controller 2.

As the transfer method, a method of outputting the reduced image at once and a method of divisionally outputting the reduced image are available.

FIG. 7A shows the process flow of outputting the reduced image at once.

It is determined whether data (reduced image data) stored in the second FIFO 16 is present (step S201). If no data is present (NO in step S201), the flow advances to step S203. If data is present (YES in step S201), the flow advances to step S202 to cause a DMA interface circuit 17 to transfer, through the CPU bus, the data stored in the second FIFO 16 to a DMA buffer region set on a main memory 18.

It is determined whether DMA transfer of all data of the reduced image data is ended (step S203). If DMA transfer is not ended (NO in step S203), the flow returns to step S201. If DMA transfer is ended (YES in step S203), the flow advances to step S204 to convert the reduced image data stored in the DMA buffer region on the main memory 18 into a data format to be output through the data communication circuit 19. Then, the data is transferred to the data communication circuit 19 and output to the controller 2 through the external communication cable 20.

The reduced image data in FIG. 7A corresponds to the reduced X-ray image and reduced offset image obtained by the processing in FIG. 6. FIG. 8 is a timing chart showing the operation of outputting the reduced image at once.

FIG. 7B shows the process flow of divisionally outputting the reduced image.

It is determined whether data (reduced image data) stored in the second FIFO 16 is present (step S211). If no data is present (NO in step S211), the flow advances to step S215. If data is present (YES in step S211), the flow advances to step S212 to cause the DMA interface circuit 17 to transfer, through the CPU bus, the data stored in the second FIFO 16 to the DMA buffer region set on the main memory 18.

It is determined whether DMA transfer of the reduced image data for one cycle of divisional transfer is ended (step S213). If DMA transfer is not ended (NO in step S213), the flow advances to step S215. If DMA transfer is ended (YES in step S213), the flow advances to step S214 to convert the divided reduced image data for divisional transfer, which is stored in the DMA buffer region on the main memory 18, into a data format to be output through the data communication circuit 19. Then, the data is transferred to the data communication circuit 19 and output to the controller 2 through the external communication cable 20.

It is determined whether output of all reduced image data to the controller 2 is ended (step S215). If output is not ended (NO in step S215), the flow returns to step S211. If output is ended (YES in step S215), the processing is ended.

The reduced image data in FIG. 7B corresponds to the reduced X-ray image and reduced offset image obtained by the processing in FIG. 6. FIG. 9 is a timing chart showing the operation of divisionally outputting the reduced image.

In the above-described way, in the X-ray irradiation state, a fill-size X-ray image is stored in the first frame memory 13, and a sampling X-ray image is transferred to the controller 2. In the X-ray non-irradiation state, a full-size offset image is stored in the second frame memory 14, and a sampling offset image is transferred to the controller 2.

After the two kinds of sampling images are transferred, the CPU 4 transfers the full image data stored in the first frame memory 13 and second frame memory 14 to the data communication circuit 19. If bus access from the CPU 4 occurs, the full image data (whole image data) are read out from the two frame memories. The subtraction circuit 21 calculates and outputs the difference between the two data. With this processing, offset-corrected full reduced image is transferred.

In the above description, the DMA interface circuit 17 has a function of a so-called DMA controller (DMAC) and functions as a bus master. However, the present invention is not limited to this. For example, a DMAC may separately be prepared on the CPU bus. If the CPU 4 incorporates a DMAC, the DMAC may be used, and the DMA interface circuit 17 may generate a DMA transfer request signal to the DMAC. The same effect as described above can be obtained even when DMA transfer itself is done by the DMAC or DMAC incorporated in the CPU.

DMA transfer need not always be executed. The same effect as described can be obtained even when the DMA interface circuit 17 is replaced with a data transfer request signal generation circuit for the CPU 4, and data transfer is executed by the CPU 4.

After the two kinds of sampling images are transferred, the CPU 4 transfers the full image data stored in the first frame memory 13 and second frame memory 14 to the data communication circuit 19. If bus access from the CPU 4 occurs, the full image data (whole image data) are read out from the two frame memories. The subtraction circuit 21 calculates and outputs the difference between the two data. With this processing, offset-corrected full reduced image is transferred.

As described above, according to this embodiment, a preview image can immediately be displayed without increasing the speed of the data output path. In addition, the quality of the obtained preview image can be maintained high. A result obtained by analyzing the preview image can be used for determining image adjustment parameters of post-processes. Hence, the processing speed of the system can be increased.

The embodiment has been described above in detail. The present invention can take an embodiment such as a system, apparatus, method, program, or storage medium. More specifically, the present invention can be applied to a system including a plurality of devices, or to an apparatus including a single device.

The present invention is also achieved even by supplying a software program (in the embodiment, a program corresponding to the flowcharts shown in the drawings) which implements the function of the above-described embodiment to the system or apparatus directly or from a remote site and causing the computer of the system or apparatus to read out and execute the supplied program code.

Hence, to implement the functional processing of the present invention by a computer, the program code itself, which is installed in the computer, also implements the present invention. That is, a computer program itself, which implements the functional processing of the present invention, is also incorporated in the claim of the present invention.

In this case, the program can take any form such as an object code, a program to be executed by an interpreter, or script data to be supplied to the OS as long as the functions of the program can be obtained.

As a recording medium to supply the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet by using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The function of the above-described embodiment is implemented not only when the readout program is executed by the computer but also when the OS or the like, which is running on the computer, performs part or all of actual processing on the basis of the instructions of the program.

The function of the above-described embodiment is also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-208881 filed on Jul. 15, 2004, the entire contents of which are hereby incorporated by reference herein.

What is claimed is:

1. An imaging apparatus which outputs, to an external device, image data obtained by an imaging unit to radiograph a subject by using radiation, comprising:
   first storage means for storing radiation image data obtained by the imaging unit in a radiation irradiation state;
   second storage means for storing reference image data obtained by the imaging unit in a radiation non-irradiation state;
   reduction means for generating reduced radiation image data and reduced reference image data as reduced image data of the radiation image data and the reference image data;
   execution means for executing offset correction processing between the radiation image data and the reference image data; and
   output means for, after output of the reduced radiation image data and the reduced reference image data to the external device is ended, outputting offset-corrected radiation image data obtained by said execution means to the external device,
   wherein said reduction means generates the reduced image data by extracting, from all pixels obtained by the imaging unit, at least one of pixel groups located on two pairs of diagonals of an n×n pixel (where n is a natural number) square region of the imaging unit, and
   wherein the value n is determined on the basis of at least one of necessary size and image quality of the reduced image data, a time allowable for output to the external device, a pixel pitch of the imaging unit, and a grid pitch of an X-ray antiscatter grid.

2. The apparatus according to claim 1, wherein said reduction means generates one pixel of the reduced image data by executing a filter operation for the extracted pixels.

3. The apparatus according to claim 2, wherein, in the filter operation, the value n is an even number, and a weight is an even function.

4. The apparatus according to claim 1, wherein said output means first outputs the reduced radiation image data to the external device at once, then outputs the reduced reference image data to the external device at once, and finally outputs the offset-corrected radiation image data obtained by said execution means to the external device.

5. The apparatus according to claim 1, wherein said output means first divides the reduced radiation image data into a predetermined division unit and sequentially outputs the data to the external device, then divides the reduced reference image data into a predetermined division unit and sequentially outputs the data to the external device, and finally outputs the offset-corrected radiation image data obtained by said execution means to the external device.

6. The apparatus according to claim 1, wherein said second storage means stores the reference image data obtained by the imaging unit in the radiation non-irradiation state after the radiation image data obtained by the imaging unit in the radiation irradiation state is stored in said first storage means.

7. The apparatus according to claim 1, wherein said reduction means first generates the reduced radiation image data substantially simultaneously with storage of the radiation image data in said first storage means, said output means outputs the reduced radiation image data to the external device, said reduction means then generates the reduced reference image data substantially simultaneously with storage of the reference image data in said second storage means, and said output means then outputs the reduced reference image data to the external device and finally outputs the offset-corrected radiation image data to the external device.

8. A control method of an imaging apparatus which outputs, to an external device, image data obtained by an imaging unit to radiograph a subject by using radiation, comprising:
   a first storage step of storing radiation image data obtained by the imaging unit in a radiation irradiation state in a first storage unit;
   a second storage step of storing reference image data obtained by the imaging unit in a radiation non-irradiation state in a second storage unit;
   a reduction step of generating reduced radiation image data and reduced reference image data as reduced image data of the radiation image data and the reference image data;
   an execution step of executing offset correction processing between the radiation image data and the reference image data; and
   an output step of, after output of the reduced radiation image data and the reduced reference image data to the external device is ended, outputting offset-corrected radiation image data obtained in the execution step to the external device,
   wherein said reduction step includes generating the reduced image data by extracting, from all pixels obtained by the imaging unit, at least one of pixel groups located on two pairs of diagonals of an n×n pixel (where n is a natural number) square region of the imaging unit, and
   wherein the value n is determined on the basis of at least one of necessary size and image quality of the reduced image data, a time allowable for output to the external device, a pixel pitch of the imaging unit, and a grid pitch of an X-ray antiscatter grid.

9. A computer-readable storage medium storing, in executable form, a program which implements control of an imaging apparatus which outputs, to an external device, image data obtained by an imaging unit to radiograph a subject by using radiation, comprising:
   a program code for a first storage step of storing radiation image data obtained by the imaging unit in a radiation irradiation state in a first storage unit;
   a program code for a second storage step of storing reference image data obtained by the imaging unit in a radiation non-irradiation state in a second storage unit;
   a program code for a reduction step of generating reduced radiation image data and reduced reference image data as reduced image data of the radiation image data and the reference image data;

a program code for an execution step of executing offset correction processing between the radiation image data and the reference image data; and a program code for an output step of, after output of the reduced radiation image data and the reduced reference image data to the external device is ended, outputting offset-corrected radiation image data obtained in the execution step to the external device, wherein the reduction step includes generating the reduced image data by extracting, from all pixels obtained by the imaging unit, at least one of pixel groups located on two pairs of diagonals of an n×n pixel (where n is a natural number) square region of the imaging unit, and wherein the value n is determined on the basis of at least one of necessary size and image quality of the reduced image data, a time allowable for output to the external device, a pixel pitch of the imaging unit, and a grid pitch of an X-ray antiscatter grid.

10. An imaging apparatus which outputs, to an external device, image data obtained by an imaging unit to radiograph a subject via a radiation antiscatter grid, comprising:

first storage means for storing radiation image data obtained by the imaging unit in a radiation irradiation state;

second storage means for storing reference image data obtained by the imaging unit in a radiation non-irradiation state;

reduction means for generating reduced radiation image data and reduced reference image data as reduced image data of the radiation image data and the reference image data by a reduction method based on reduction ratio of the reduced image with respect to the entire image, pixel pitch of the imaging unit, and the grid pitch of the radiation antiscatter grid;

execution means for executing offset correction processing between the radiation image data and the reference image data; and output means for, after output of the reduced radiation image data and the reduced reference image data to the external device is ended, outputting offset corrected radiation image data obtained by said execution means to the external device.

11. A control method of an imaging apparatus which outputs, to an external device, image data obtained by an imaging unit to radiograph a subject via a radiation antiscatter grid, comprising:

a first storage step of storing radiation image data obtained by the imaging unit in a radiation irradiation state in a first storage unit;

a second storage step of storing reference image data obtained by the imaging unit in a radiation non-irradiation state in a second storage unit;

a reduction step of generating reduced radiation image data and reduced reference image data as reduced image data of the radiation image data and the reference image data by a reduction method based on reduction ratio of the reduced image with respect to the entire image, pixel pitch of the imaging unit, and the grid pitch of the radiation antiscatter grid;

an execution step of executing offset correction processing between the radiation image data and the reference image data; and an output step of, after output of the reduced radiation image data and the reduced reference image data to the external device is ended, outputting offset corrected radiation image data obtained in the execution step to the external device.

12. A computer-readable storage medium storing, in executable form, a program that causes a computer to control of an imaging apparatus which outputs, to an external device, image data obtained by an imaging unit to radiograph a subject via a radiation antiscatter grid, comprising:

a program code for a first storage step of storing radiation image data obtained by the imaging unit in a radiation irradiation state in a first storage unit;

a program code for a second storage step of storing reference image data obtained by the imaging unit in a radiation non-irradiation state in a second storage unit;

a program code for a reduction step of generating reduced radiation image data and reduced reference image data as reduced image data of the radiation image data and the reference image data by a reduction method based on reduction ratio of the reduced image with respect to the entire image, pixel pitch of the imaging unit, and the grid pitch of the radiation antiscatter grid;

a program code for an execution step of executing offset correction processing between the radiation image data and the reference image data; and a program code for an output step of, after output of the reduced radiation image data and the reduced reference image data to the external device is ended, outputting offset corrected radiation image data obtained in the execution step to the external device.

* * * * *